United States Patent [19]

Ericsson

[11] 4,340,329
[45] Jul. 20, 1982

[54] LASHING DEVICE

[76] Inventor: Sven O. Ericsson, Barkassväëü ää üöü

[21] Appl. No.: 199,259

[22] Filed: Oct. 21, 1980

[30] Foreign Application Priority Data

Nov. 5, 1979 [SE] Sweden .................................. 7909127

[51] Int. Cl.³ .................... A44B 21/00; B60P 7/08; B61D 45/00
[52] U.S. Cl. .................... 410/100; 24/68 CD; 254/243; 410/101; 410/103
[58] Field of Search ............. 24/34, 68 CD, 69 ST, 24/69 CT, 71 TD; 108/55.1, 55.3, 55.5, 56.3; 298/205 R, 499, 500, 505, 510, 503, 503.1; 254/209, 243, 248, 251, 384, 256, 258; 410/10, 11, 12, 21, 23, 55, 97, 100, 156, 96, 101, 102, 103, 109, 105, 106, 107, 108, 110, 111, 112, 113, 114, 115, 116

[56] References Cited

U.S. PATENT DOCUMENTS

| 2,291,792 | 8/1942 | Caston | 24/71.3 |
| 3,125,907 | 3/1964 | Derrickson | 24/71.3 X |
| 3,161,149 | 12/1964 | Monus | 410/112 |
| 3,203,058 | 8/1965 | Roing | 24/71.3 X |
| 3,428,331 | 2/1969 | Morgan | 410/100 |
| 3,574,342 | 4/1971 | Berns | 254/243 |
| 3,753,407 | 8/1973 | Tilseth | 108/53.3 |
| 3,858,279 | 1/1975 | Brattstrom | 24/71.3 |

*Primary Examiner*—Philip R. Coe
*Assistant Examiner*—Frankie L. Stinson
*Attorney, Agent, or Firm*—Cantor and Singer

[57] ABSTRACT

A lashing device for tightening a band securing cargo at a platform is swingably mounted within a recess in one side of the platform, and comprises a lever structure and a locking member. The lever structure includes two parallel bars arranged parallel to the pivot and around which a loop in the band may be led. The lever structure comprisesa securing hook for cooperation with the locking member and a pedal by means of which the necessary force for tightening the band is applied.

8 Claims, 5 Drawing Figures

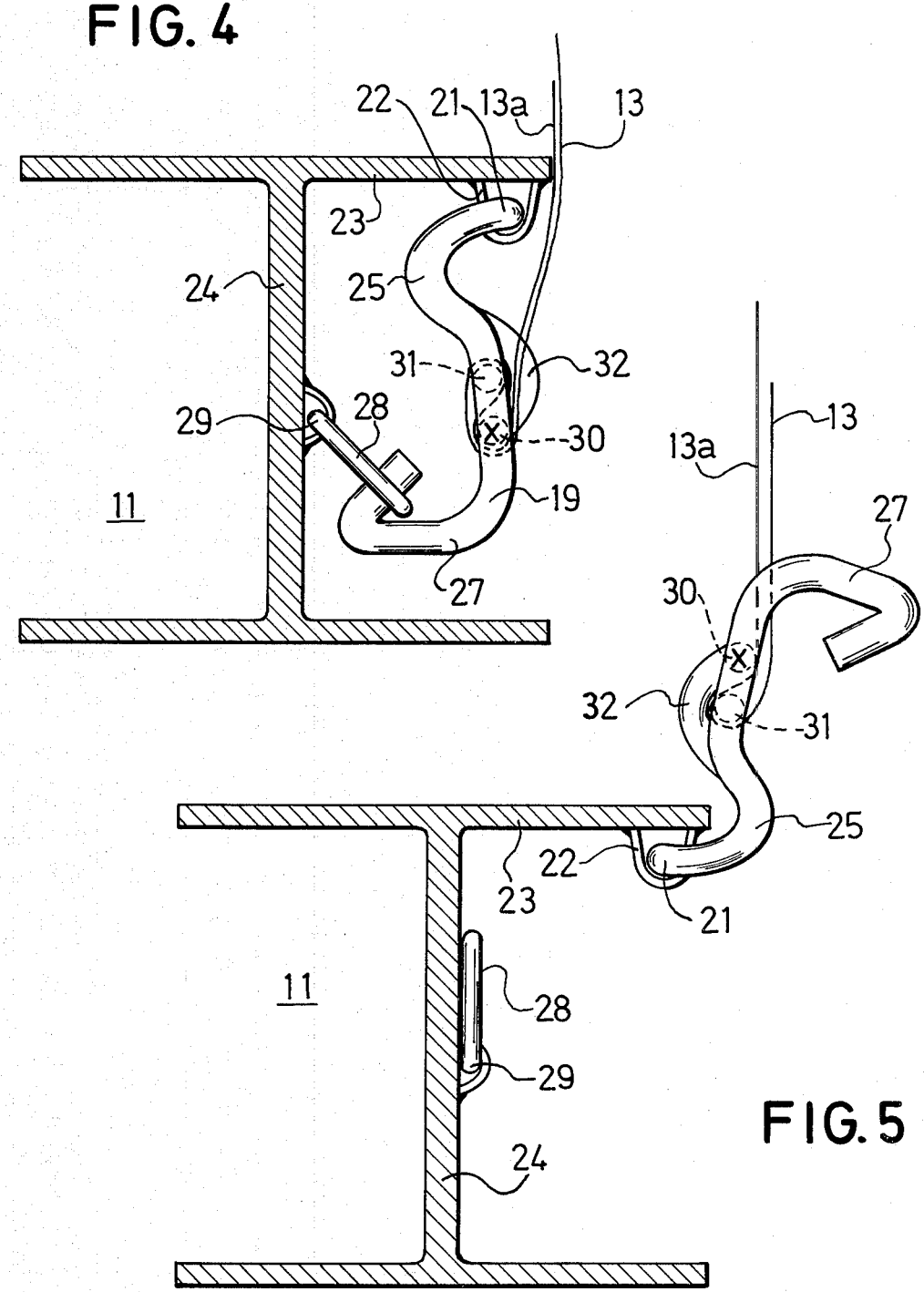

LASHING DEVICE

BACKGROUND OF THE INVENTION

Within modern cargo handling, transportation of goods upon platforms occupies a central position. Platform transportation means that you locate goods of various kinds upon individual, plane carriers, and then lash the pieces of cargo thereto, so the platform, together with the cargo thereon, can be handled as a unit.

Hitherto used technique for lashing and securing the goods to the platform has raised several problems. Initially ropes were used, which were tied by conventional knots for securing the goods. A later development of the lashing means has brought forward bands of textile materials, usually synthetic fibres, which offer big advantages from the handling point of view. Steel bands have also been used, but makes it necessary to perform lashing and securing in a mechanized way, usually as part of a standardized process.

When using textile bands for lashing purposes the tightening and the locking of the band has been brought about by means of different types of levers and locking devices, which have been applied to the band itself.

These devices, for instance of the bear type levers and the like, require a considerable force to be applied, and they must often be located so the man performing the lashing will not obtain the best position for applying the required force. It has furthermore shown, that these levers will often loose their grip in their sockets, or slip the hands of the operator, just during the securing moment, which has caused damages to the personnel.

A further disadvantage with known lashing devices is the great loss to be taken into account during return voyages. The textile bands are fairly easy to collect, but the levers, which are separable from the bands and rather heavy, will easily be lost.

SUMMARY OF THE INVENTION

The aim of the present invention is to propose a lashing device for bands, which on the one hand is permanently mounted at the platform, whereby loss of devices is prevented, and on the other hand can be located in a protected position, whereby damages are avoided, while furthermore facilitating the application of the necessary force for tightening.

A lashing device according to the invention is intended for use with a platform having a recess defined by a roof portion and a side wall along at least one of its sides, and is characterized by a lever structure, swingably supported at the roof portion of the recess by means of a pivot parallel to said side, and comprising two parallel bars arranged parallel to the pivot and adapted to receive a loop of the lashing band, means for securing the lever structure in relation to the side wall of the recess, and further means for applying a force to the lever structure in order to swing the same from a position outside of the recess to a position within the same.

The lever structure preferably comprises two substantially parallel rods, spaced apart a distance at least corresponding to the breadth of the strapping band, and mounted at the pivot, carrying the bars at a distance from the latter, a securing hook extending angularly inwards from one of the rods towards the side wall of the recess, and a power transferring pedal extending from the other of the rods, substantially parallel to the side of the platform, a locking member being swingably mounted at the side wall for cooperation with the securing hook.

The portions of the rods located at a distance from the pivot corresponding to the measure from the latter to the outward edge of the roof portion are preferably bent so the lever structure, when fitting the band, can be swung to a position above the recess.

The bar, which in locking position will be the uppermost one, is attached to one of the rods only and sidewardly extends past the other rod, the other rod opposite to the passing free bar being formed with a bent portion, partly encircling the free bar for permitting a loop of the band to be slipped upon the bar from the free end thereof.

The lever structure is preferably, in a manner known per se, designed so the centers of the bars in locking position will be brought past a vertical plane passing through the pivot axis and the locking member is preferably formed as a hoop, swingable about an axis being parallel to the side of the platform.

BRIEF DESCRIPTION OF THE DRAWINGS

FIG. 4 shows a section through the marginal portion of the platform, with the device in locking position, and FIG. 5 shows the device in position for reception of the band.

DESCRIPTION OF A PREFERRED EMBODIMENT

Figure 1:
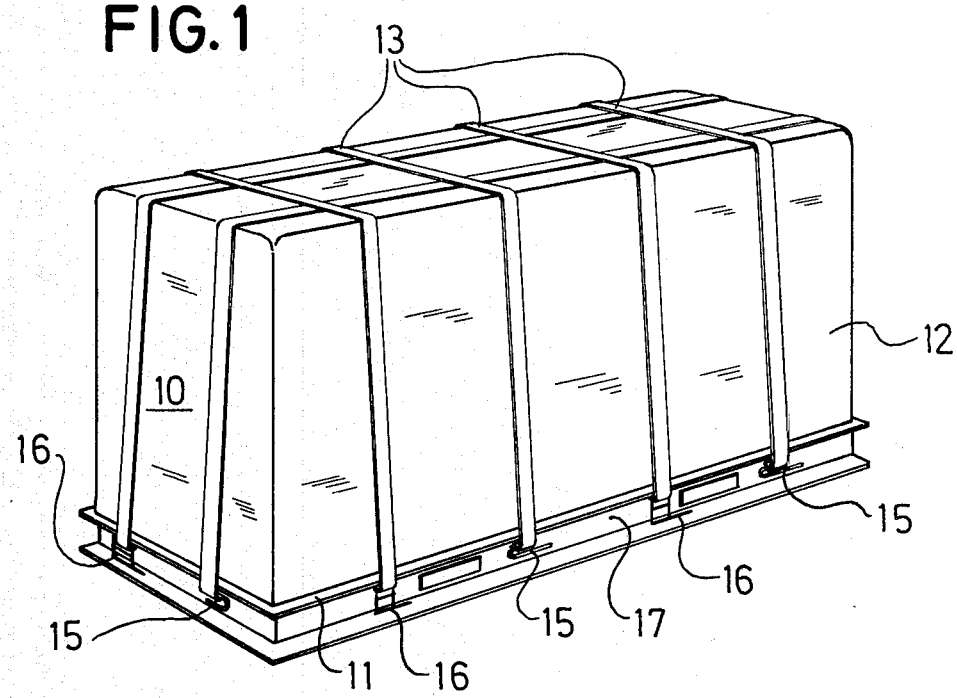
FIG. 1 schematically shows a loaded platform lashed with bands tightened with devices according to the invention.
Figure 2:
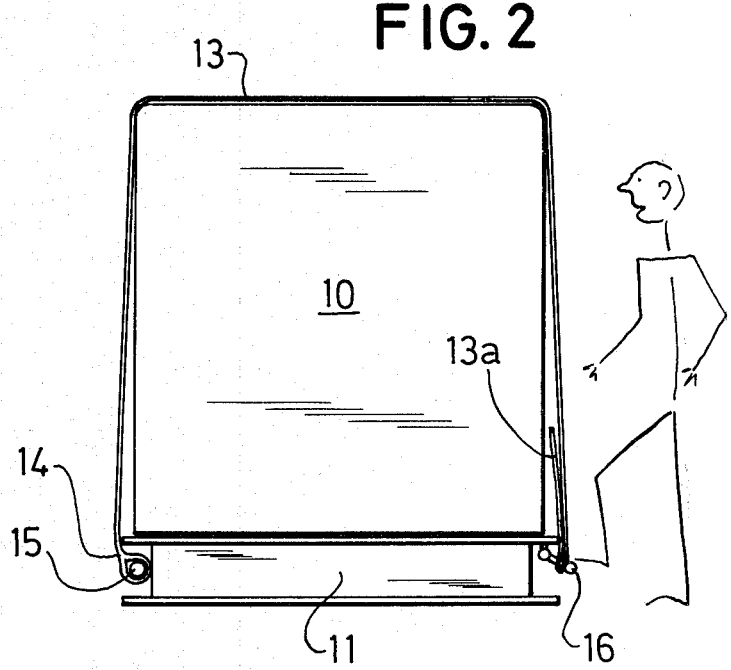
FIG. 2 shows how the device is used for tightening the band, FIG. 3, on a larger scale, shows a perspective view, partly in section, of the device hanging freely within the associated recess.

FIGS. 1 and 2 schematically show a cargo unit 10 comprising pieces of goods of arbitrary kind stacked upon a platform 11, and covered by a tarpaulin 12. The pieces of goods are secured to the platform by means of a number of textile bands 13, which are arranged transversely as well as longitudinally across the platform. The latter is of arbitrary known type, having dimensions according to ISO-standard. The bands are manufactured of synthetic fibres, and are attached to the platform by one end thereof being sewn to form an eye 14, which may be fitted upon a stud 15 mounted at the platform. The opposite end of the band is tightened by means of a device 16 according to the invention, in a manner to be described below. Preferably studs 15 and tightening devices 16 are alternatingly located along the sides of the platform.

The platform may be manufactured in different ways, but a basic concept comprises an edge frame of U or I beams, whereby a longitudinally running groove 17 is obtained along each side of the platform. Within this groove the tightening devices 16 will be located so as to be well protected, but easily accessible for operation in connection with securing of cargo.

Figure 3:
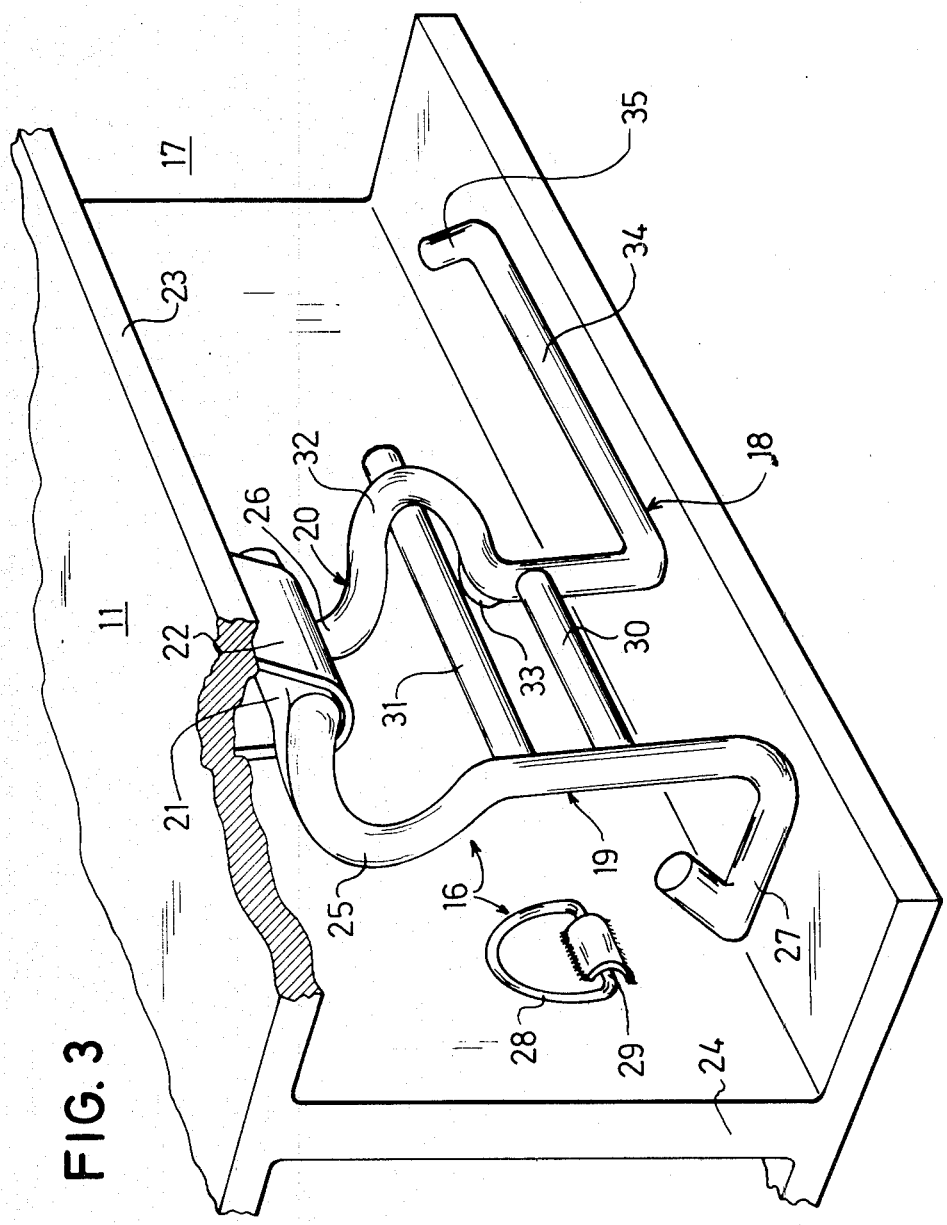

A preferred embodiment of the lashing device according to the invention is shown in FIGS. 3–5. Each device comprises a lever structure 18, which includes two rods 19 and 20. The latter are arranged in parallel relationship and spaced apart a distance substantially corresponding to the breadth of the band 13 to be used. The rods 19 and 20 are, at their inward ends, interconnected by a pivot 21, which is rotatably mounted in a drop hanger 22 at the edge of groove 17, and parallel to the side of the platform.

In order to simplify the description it is presupposed, that the groove 17 is upwardly defined by a roof portion 23, and inwardly by a side wall 24, and the device will be described with reference to the positions the lever structure will occupy in operating position and in locked position extending downwardly from the roof portion 23, respectively.

The two rods 19 and 20 are at their inward ends provided with bent portions 25 and 26, respectively, which are so located in relation to the distance between the pivot 21 and the outward edge of roof portion 23, that the lever structure 18 may be swung up above the platform, in the manner shown in FIG. 5, which is advantageous with respect to the introduction of the band into the lever structure.

Rod 19 runs from its bent portion 25 straight outwards, and is then bent inwards, towards side wall 24, terminating in a securing hook 27. A locking hoop 28 is mounted at side wall 24, being swingable about a shaft 29, and is designed in such a manner that it may be folded down to grip the securing hook 27. The lever structure may thus be locked in unloaded condition during a return voyage, as well as when a band 13 is tightened by the device.

The two rods 19 and 20 are further interconnected by means of a first bar 30, attached to both rods. A second bar 31, running parallel to the first one, and in rest position being located above the first bar, is attached to rod 19, but extends freely past rod 20. The latter is provided with a bent portion 32, which partly encircles the opposite part of bar 31. Below bar 31 the rod 20 is provided with a projection 33 for bar 31, which may be elastically deformed due to the tension of the tightened band 13.

The outward end of rod 20 is bent sidewardly, in parallel to the side of the platform, and forms a pedal 34, which is used for tightening the band. The end 35 of the pedal 34 is bent inwards in relation to the groove, so as to minimize the risk of the pedal catching foreign objects.

In order to simplify identification the fixed bar 30 is in FIGS. 4 and 5 marked with a cross. When a band 13 is to be fastened the eye 14 at one of its ends is mounted upon its stud 15, whereupon the band is laid over the cargo unit so an end portion will hang down towards the lever structure, which is brought to the upright position shown in FIG. 5. The bar 31, which is free from rod 20, permits a loop of the band to be slipped in sidewardly between the bars, so an upwardly directed end part 13a is obtained. The operator may hold this part by one hand, clamping it to the downwardly running, main part of the band 13. With one foot on the pedal 34 the operator may then force the lever structure downwards to tension the band 13. If the pieces of goods upon the platform are loosely stacked they may be compressed, which means that the tightening operation may have to be repeated several times. The lever is braked downwardly by the foot remaining upon the pedal, while simultaneously the lever is raised to the position shown in FIG. 5 by pulling at band end 13a. Then the band parts are clamped together and the lever is again forced downwards, it may be necessary to "pump" repeatedly in this manner, in order to obtain a satisfactory tightening of the band around the goods. During this operation the locking hoop 28 is maintained in a raised position. During the last pumping action the lever structure is forcefully struck against the side wall 24, whereby the locking hoop 28 is jarred and automatically falls down to catch the securing hook 27. The locked position is shown in FIG. 4, and it is evident how the looped portion of band 13 runs around bar 31 and that both parts of the band pass by bar 30, and then continue up along the stack of goods, whereby a secure retention of the band is obtained. Part 13a will rest against the edge of the groove, and will thus protect the main part 13 of the band from wearing. If the band 13 is tightened very hard it may happen that bar 31 will be elastically deformed downwardly, as shown in FIG. 4. The free end of the bar will then rest against support 33 at rod 20.

In order to increase the locking of the loaded lever structure the latter is designed in such a manner than the centers of bars 30, 31, in locking position are brought past a vertical plane through the axis of pivot 21.

The embodiment shown is an example only, the details of which may be varied in many ways within the scope of the appended claims. Instead of being provided with bent portions 25, 26, the rods may be maintained straight, while instead notches are made in the edge of the roof portion 23. The platform may be provided with end grids, and there are platforms which do not have longitudinally running grooves along all sides. It will then be necessary to arrange recesses or pockets in the edge portions at suitable positions, to provide the desired protected mounting of the levers, inside the contour of the platform.

The expression platform must be interpreted in a wide sense, and there are numerous similar cargo carrying flats and pallets forming parts of trucks and other cargo handling trolleys, where lashings of the type described above may advantageously be used.

Instead of the simple falling loop 28 different types of spring loaded members may be used to secure the lever. In view of the position exposed to attacks from rust and dirt, simplicity should however be favoured.

When the platform forms part of a trailer or the like and thus normally has an elevated position, it may be difficult to apply the foot to pedal 34. The latter is therefore formed so it will also provide a good grip for a hand. In order to make possible the application of sufficient force during the final tightening operation, rod 19 may also be provided with an extension, directed oppositely to pedal 34 so both hands may be used.

To apply the necessary force to a lever structure mounted at a trailer or truck deck a separate lever may be used. This lever has an eye at one end to be fitted upon the end of bar 31 projecting past rod 20, and can in the position shown in FIG. 5, be made to act upon pedal 34.

What I claim is:

1. A device for securing a load to a platform and comprising a lever structure swingably mounted at said platform by means of a pivot parallel to a side of the platform, said lever structure, in order to make possible the use of a strapping band, including two substantially parallel rods, spaced apart a distance at least corresponding to the breadth of the strapping band, and mounted at the pivot, two parallel bars carried by said rods, arranged parallel to the pivot at a distance from the latter, the bar, which in locking position will be the uppermost one, being attached to one of the rods only, and sidewardly extending past the other rod, said other rod, opposite to the passing free bar being formed with a bent portion, partly encircling the said bar for permitting a loop of the band to be slipped upon the bar from the free end thereof, and locking means at said platform for retaining said lever structure in locked position.

2. The device according to claim 1 including a recess in the side of said platform, said recess being defined by a roof portion and a side wall, said lever structure comprising force applying means, fitting into said recess, for swinging said lever structure from a position outside of the recess to a position within the same.

3. The device according to claim 2 further including a securing hook extending angularly inwards from one of said rods towards the side wall of the recess, and a power transferring pedal extending from the other of said rods, substantially parallel to the side of the platform, a locking member being swingably mounted at said side wall for cooperation with said securing hook.

4. The device according to claim 3, in which the portions of said rods, located at a distance from said pivot corresponding to the measure from the latter to the outward edge of said roof portion are bent so said lever structure, when fitting the band, can be swung to a position above the recess.

5. The device according to claim 1, in which the bent portion at said other rod is provided with a projection for supporting said upper bar.

6. The device according to claim 1, in which the lever structure is designed so the centers of the bars in locking position will be brought past a vertical plane passing through the pivot axis.

7. The device according to claim 1, in which the locking member is formed as a hoop, swingable about an axis being parallel to the side of said platform.

8. The device according to claim 1, in which said other rod at its end remote from the pivot is provided with an outwardly directed force applying member running parallel to the side of the platform.

* * * * *